United States Patent [19]

Dischert et al.

[11] 4,101,926
[45] Jul. 18, 1978

[54] TELEVISION SYNCHRONIZING APPARATUS

[75] Inventors: Robert Adams Dischert, Burlington; Arthur James Banks, Cherry Hill; Robert Sherman Hopkins, Jr., Marlton, all of N.J.

[73] Assignee: RCA Corporation, New York, N.Y.

[21] Appl. No.: 755,944

[22] Filed: Dec. 30, 1976

[30] Foreign Application Priority Data

Mar. 19, 1976 [GB] United Kingdom ............... 11114/76

[51] Int. Cl.² .......................... H04N 9/44; H04N 9/46
[52] U.S. Cl. ........................................ 358/17; 358/19; 358/148
[58] Field of Search ....................... 358/12, 13, 17, 19, 358/21, 148, 149, 150, 181, 182, 183

[56] References Cited

U.S. PATENT DOCUMENTS 4,018,990  4/1977  Long et al. ............................ 325/149

*Primary Examiner*—Robert L. Richardson
*Attorney, Agent, or Firm*—Eugene M. Whitacre; P. J. Rasmussen; Robert L. Troike

[57] ABSTRACT

Television synchronizer apparatus includes a coherent memory with preassigned fixed burst phasing of 0° or 180° for each line store of color video image information. The incoming synchronizing components including burst are discarded on the premise that they are well-known repetitive functions. The incoming color video image information is read into the memory coherent with the preassigned burst phasing, thereby significantly reducing the memory storage capacity normally utilized to store sync and burst information.

3 Claims, 9 Drawing Figures

TELEVISION SYNCHRONIZING APPARATUS

BACKGROUND OF THE INVENTION

This invention relates to television synchronization apparatus and especially to apparatus for synchronizing the television signals from two or more non-synchronous sources of video information read into memory.

In modern television programming, it is generally necessary to integrate a mix of external and studio video sources smoothly into live programs. An example of such a requirement is the increasing use of Electronic Journalism (EJ) facilities for on-the-spot news broadcasts. The wide diversification of such program sources has emphasized the need for synchronizing systems to incorporate non-synchronous video signals originating outside the local studio. Integrating a non-synchronous source into an existing program presents a serious production problem, since it is necessary to gen-lock studio sync to the outside signal or to use additional sync generators for the proper timing reference. Gen-locking to the external non-synchronous source is particularly troublesome in that only one source at a time may be utilized and that source tends to disrupt the internal studio sync timing. The use of multiple sync generators is expensive and creates further operational difficulties in maintaining gen-lock between the multiple generators. Similar problems are encountered in network cable and satellite transmission systems even though expensive rubidium standards are used because changes in the electrical path length causes the color phase of the video signal to drift, even though the horizontal signal timing component may be relatively stable.

A video synchronizer may be advantageously used to overcome the problems of incorporating non-synchronous program sources into a local studio broadcast where the conventional gen-locking methods described above do not provide a satisfactory solution. A video synchronizer is primarily a digital device, which accepts a non-synchronous video signal input from any external source, converts the signal from analog to digital format; stores the digitized signal in a memory; converts the digital signal back to analog form and processes the reconverted signal through a signal processing amplifier wherein sync, blanking and color burst signals are added to the output video signal. The digitized video information stored in memory is read out of the memory at a rate which is synchronous with the local studio sync generator timing. Since the reconstituted video signal is now completely synchronous with the local studio reference, it may be used directly for mixing, special effects, etc., similar to the manner in which a live camera, a video tape machine or other studio source is used.

SUMMARY OF THE INVENTION

A television signal synchronizer is provided in which incoming video signals of one or more television fields, comprising horizontal line signals having a horizontal blanking interval containing horizontal and burst synchronizing signal components and an active image information portion, with the burst signal component being opposite in phase from one of said television fields to another, are written into memory storage means. The synchronizer includes a coherent memory storage means having preassigned fixed burst phasing for each line store of the memory storage means and signal processing means for developing a composite horizontal sync and burst timing control signal indicative of the timing of the incoming video signal. Delay means responsive to the control signal delays the writing into memory of the video image information so as to write only the active video image information portion(s) into the memory storage means coherent with the preassigned fixed burst phasing.

DESCRIPTION OF THE INVENTION

Figure 1:
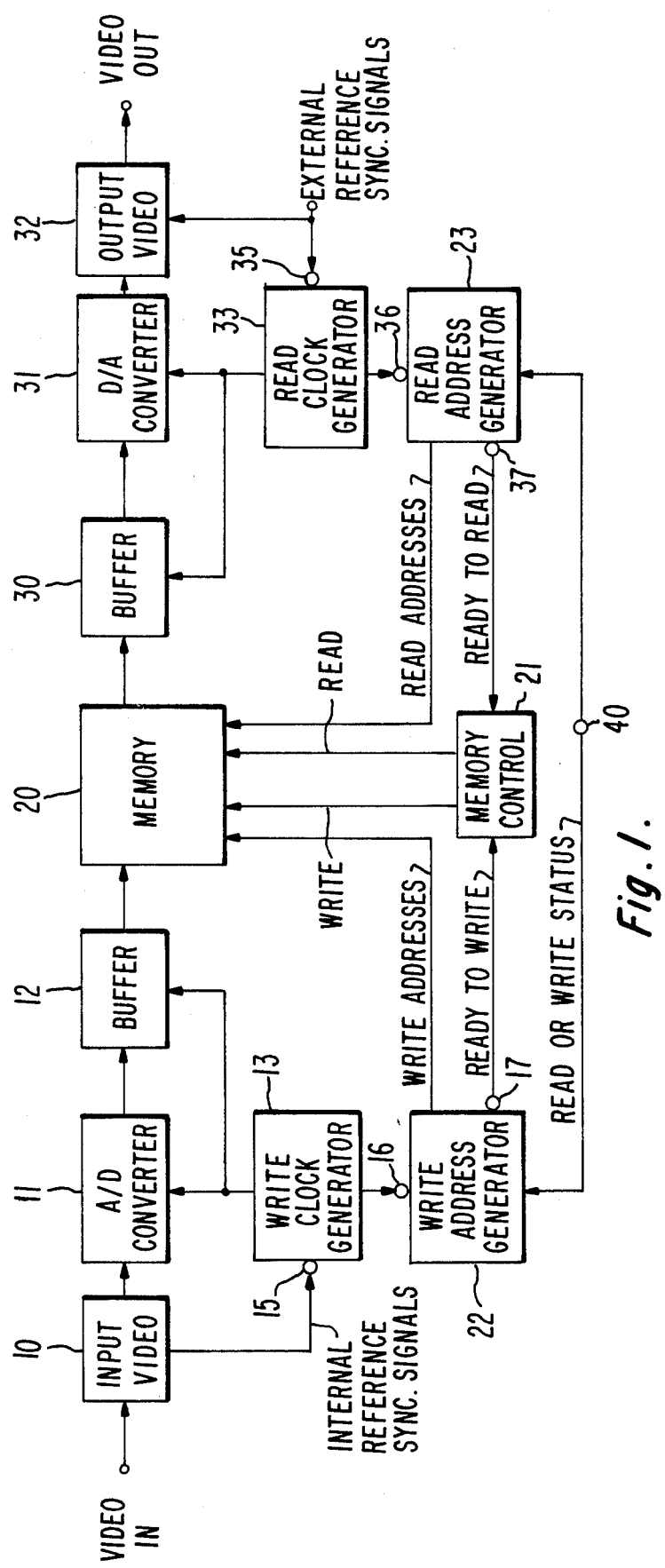
FIG. 1 is a block diagram of a television signal synchronizer embodying the present invention.

In FIG. 1, a signal (Video In) from a non-synchronous source, such as an Electronic Journalism (EJ) camera, is coupled to an input terminal of an input video processor 10 in which the incoming video signal synchronizing components and burst timing information are separated from the active picture information. The separated timing information is coupled to a write clock generator 13 which develops timing information in the form of 14.3MHz pulses (four times the NTSC subcarrier frequency of 3.58MHz), synchronous with the incoming signal timing information, for enabling an analog-to-digital (A/D) converter 10, buffer 12 and write address generator 22. The active picture information portion of the incoming video signal is bandwidth limited to 5.5 Megahertz in the input video processor 10 and coupled from the output terminal of video processor 10 to the input terminal of A/D converter 11, of known form, where the signal is converted (sampled at a 14.3 Megahertz word rate) into digital form consisting of 8 bit parallel code words.

The signal output of A/D converter 10, in the form of a digitally sampled input video signal, is coupled to a buffer 12 and, in turn, to picture memory 20 for storage. The digital picture information signal is stored at discrete locations in the memory in accordance with specific address codes referenced to burst, vertical and horizontal sync signals generated by the write address generator 22 in response to the related incoming signal timing information generated in the write address clock.

Figure 2:
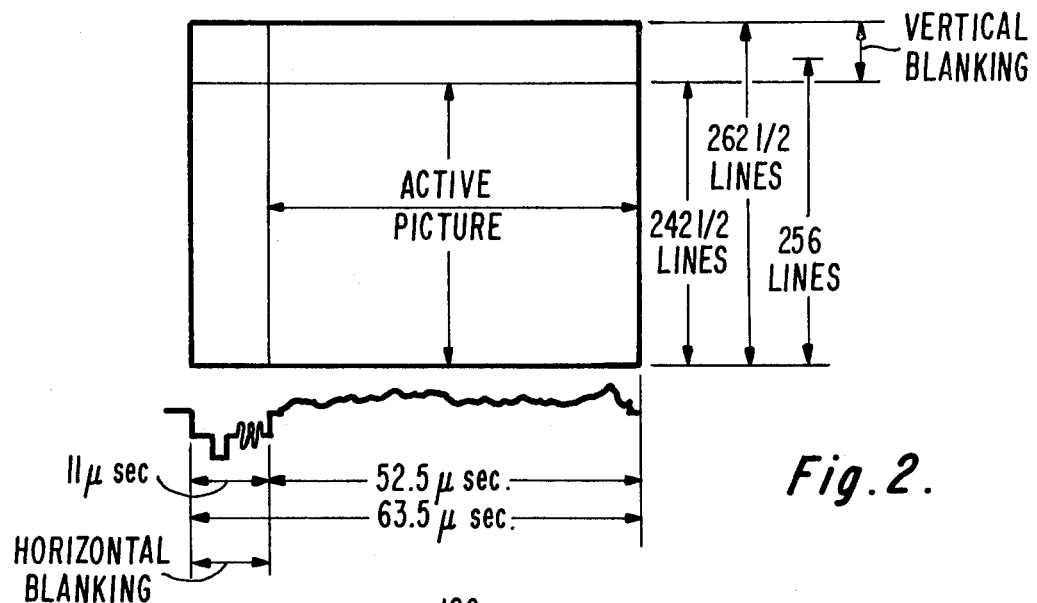
FIG. 2 illustrates in graphical form typical television line and field standards useful in understanding the invention.

Memory 20 is constructed, for example, with memory integrated circuits, such as the Fairchild 40965DC RAM. A typical integrated circuit RAM of the type described has a storage capacity of 4096 bits of information. The total capacity of the memory 20 is determined by the number of bits of information desired to be stored. In a typical synchronizer of the type illustrated in FIG. 1, constructed in accordance with known techniques and utilizing a clock rate of 14.3 Megahertz, a field memory store would require 7280 bits of memory (910 samples times 8 bits per sample) for each horizontal line period of 63.5 Microseconds, which yields a total of 1,863,680 bits of memory for storing the 256 lines of information corresponding to the 262 ½ vertical lines in a full field, as illustrated in FIG. 2. The indicated reduction of vertical line storage from 262 ½ to 256 is a practical solution to reducing the expensive memory cost consistent with economical memory logic structure. As illustrated in FIG. 2, the active picture area actually comprises 242 ½ lines with the other 20 lines being utilized for the vertical blanking interval. The vertical blanking interval also contains other signal processing information, such as the Vertical Interval Test Signal (VITS) on lines 17 and 18; Vertical Interval Reference Signal (VIRS) on line 19; and the Field Source Identification Signal on line 20 — therefore, it is possible to completely store the 242 ½ active vertical picture information lines per field as well as the vertical interval signal processing information within the 256 lines of memory by beginning the vertical line information storage at line 15.

If the synchronizer is to be of the full frame variety, which requires the storage of two complete fields, the memory store would require 910 samples per line times 8 bits per sample times 256 lines per field times 2 fields or 3,727,360 bits of memory.

As previously described, the digital picture information is coupled from input video processor 10 to the memory store by means of a buffer 12. Buffer 12 provides a convenient means to overcome a limitation on the data read-in rate of the typical integrated circuit RAM's currently available. The 14.3 MHz clock rate at four times subcarrier was selected to provide sufficient resolution of the picture information being digitized in the A/D converter; however, the typical RAM data read-in rate is generally limited to a 2 MHz rate. Buffer 12, which is in the form of an 8 bit-serial-in/parallel-out configuration (SIPO) provides a convenient means of accommodating this difference in data rates. Data is serially read into buffer 12 at the 14.3 MHz rate and may be read-out in parallel form at no more than one-eighth of the read-in rate, thus readily adjusting the incoming signal to the data-into-memory information rate of 2 MHz.

In order to recover the picture information stored in the memory 20, the signal conversion process is reversed as follows: the data stored in memory is read-out of memory into 20 into a parallel-in/serial-out (PISO) buffer, which is, in turn, coupled to a digital-to-analog (D/A) converter 31, which converts the 8 bit code word back to a conventional analog picture by timing information and read address generated by read clock generator 33 and read address generator 23, which are synchronized to the local studio reference. The output of D/A converter 31 is coupled to an output video processor 32 in which the blanking interval, sync and burst corresponding to local studio reference are added to the recovered picture information to restore the output video signal to a complete composite video signal, as illustrated in FIG. 2. Thus, the picture information, which was stored in memory 20 from a non-synchronous source is read-out of the memory synchronous with the local studio reference, which makes the signal suitable for programming production requirements of mixing, special effects and switching similar to the manner in which a live camera, VTR tape or other source is used.

Memory control 21 completes the synchronizer of FIG. 1 and includes logic circuitry which responds to status signals from the write and read address generators identified in FIG. 1 as read-to-write and ready-to-read, respectively, so as to provide write and read signals to memory 20 to insure that reading and writing into the same address location does not occur simultaneously as would be the case where non-synchronous video sources may drift ahead and behind the fixed local studio reference.

In accordance with the principles of the present invention, the required memory storage capacity of memory 20, as described in conjunction with FIG. 1, may be significantly reduced by constructing memory 20 in coherent form having a preassigned burst phasing of 0° or 180° for each line store of the color video image portion of the composite video waveform. It is readily recognized that in a television signal synchronizer, the horizontal sync timing and burst phasing information contained in the horizontal blanking interval of the incoming video signal is utilized only for purposes of identification for proper writing-into-memory of the image portion of the video signal; and that new horizontal sync and bursts timing components synchronous with the local (studio) reference are established during the readout of the memory store 20. Since these incoming synchronizing components are discarded during readout, it is similarly possible in accordance with the invention to discard the incoming synchronizing components including the burst phasing information on the premise that they are well-known repetitive functions; therefore, the incoming color video information is read into memory 20 coherent with the preassigned burst phasing. Discarding, i.e., not storing, the horizontal blanking interval information during each horizontal line reduces the time period of each line during which information is to be stored to 52.5 μsec corresponding to the actual video image portion of the line, as illustrated in FIG. 2. Utilizing the same clock rate of 14.3 MHz, as previously described, the number of samples per line to be stored is reduced from 910 to 768, thereby significantly reducing the overall capacity and cost of memory 20 by approximately 16%. However, discarding of the incoming burst signal component, which represents the color phasing of the video information, presents a further problem which must be resolved if the advantages of a coherent memory having a preassigned burst phasing are to be realized. In the NTSC color system, there are four distinct fields in a color signal with the burst phasing of each odd field being precisely 180° from the succeeding odd field; thus, if field 1 is designated as having an initial burst phasing of 0°, field 3 will have a burst phasing of 180°, and, therefore, the even fields 2 and 4 are 180° and 0°, respectively. Therefore, in a coherent memory having a preassigned fixed burst phasing for example, fields 1 and 4 at 0° and fields 3 and 2 at 180°, it is necessary to modify the reading into memory of fields 3 and 2 so that these fields are stored with identical burst phasing to fields 1 and 4. FIGS. 3 and 4a–4f illustrate how write clock generator 13 and write address generator 22 of the apparatus of FIG. 1 may be modified in accordance with the principles of the invention to provide coherence of the image information being written into a coherent memory store.

Figure 3:
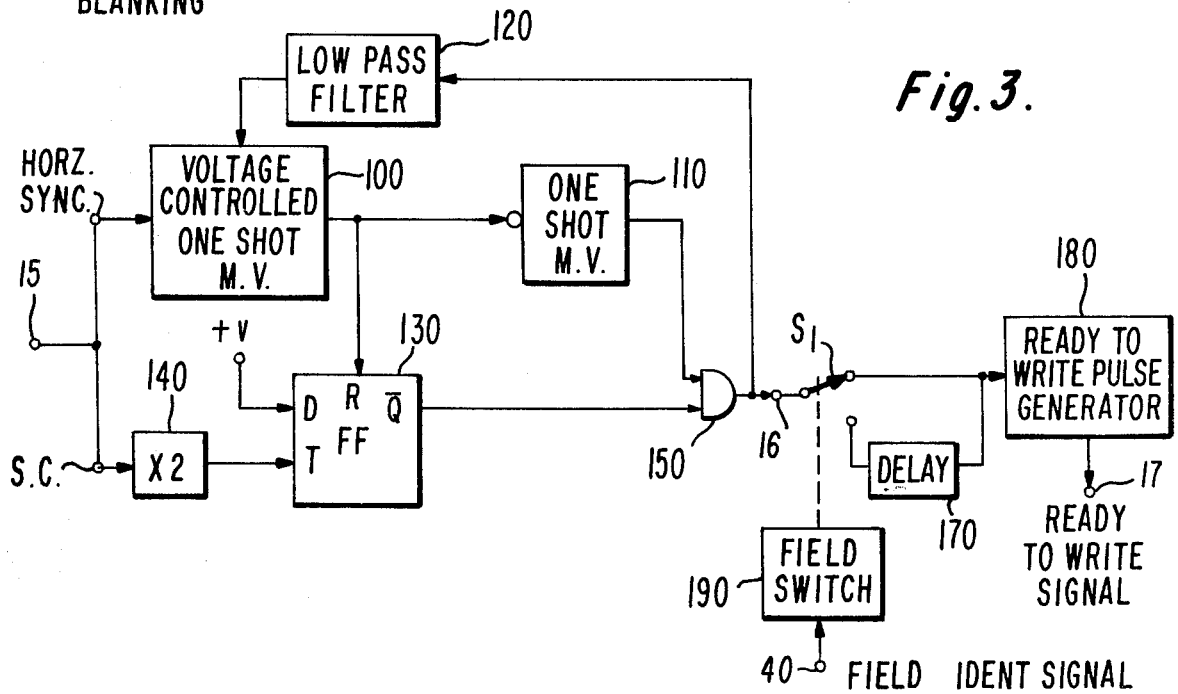
FIG. 3 is a block diagram of the coherent memory write signal logic embodying the present invention.
Figure 4A:
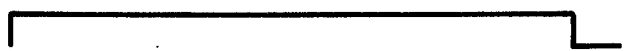
FIGS. 4a, 4b, 4c, 4d, 4e and 4f illustrate waveforms depicting the operation of the block diagram of FIG. 3.
Figure 4B:
Figure 4C:
Figure 4D:
Figure 4E:
Figure 4F:

The incoming horizontal sync timing and burst information from input video processor 10 appearing at terminal 15 of FIG. 1 is coupled to a subcarrier crossover detector in the write clock generator 13 of FIG. 1 illustrated in FIG. 3 as follows. The horizontal sync of approximately 5 μsec duration (waveform 4a) is coupled to the input terminal of a voltage controlled one-shot multivibrator 100 which produces a pulse of approximately 2.3 μsec duration (waveform 4b) timed from the leading edge of the horizontal sync pulse. The output signal of multivibrator 100 is coupled to a one-shot multivibrator 110 which produces a pulse of a duration greater than 140 nanoseconds timed from the trailing edge of waveform 4b and to the reset terminal R of a D flip-flop 130. The output signal from multivibrator 110 and the $\overline{Q}$ output signal from D flip-flop 130 are coupled to the input terminals of an AND gate 150. The burst subcarrier is coupled to a multiplier 140 where its frequency is doubled and in turn to terminal T of the D flip-flop where it serves as a trigger or clock signal for "D" type flip-flop 130. A biasing voltage +V is coupled to the enabling input terminal of flip-flop 130 to condition the $\overline{Q}$ output of flip-flop 130 for a LOW level.

Insofar as described, the operation of the subcarrier crossover detector of FIG. 3 operates in the following manner. The incoming horizontal sync (waveform 4a) enables multivibrator 100 (waveform 4b), which, in turn, enables multivibrator 110 (waveform 4c) providing one input to AND gate 150 and resets D flip-flop 130 (waveform 4d), which provides the other input to AND gate 150. The subcarrier output of multiplier 140 (waveform 4e) then triggers "D" flip-flop 130 on the very next edge of subcarrier corresponding to a positive edge of 2 times subcarrier, which causes the $\overline{Q}$ output of the D flip-flop to go low and disable AND gate 150. The trailing edge of the output pulse of AND gate 150 (waveform 4f) represents a precise location for this modified sync signal with respect to burst which is necessary when burst and sync are not stored. Since the subcarrier burst signal is not defined in the television standards with respect to the leading edge of sync, it is possible for the output of AND gate 150 to vary in width from approximately 0 to 140 nanoseconds in time with 0 time representing a coincidence between subcarrier and the leading edge of sync so as to prevent the subcarrier crossover detector of FIG. 3 from reliably indicating the burst phasing at the output of AND gate 150. To avoid this problem, a hysteresis feedback loop is incorporated in the circuit of FIG. 3 by coupling the output of AND gate 150 to a low pass filter 120, which develops a voltage at its output representing the average width of the output pulse of AND gate 150. The output signal of low pass filter 120 is coupled to voltage controlled multivibrator 100 where it is utilized as a control voltage to modify the duration of the output signal of multivibrator 100 to insure an adequate time difference for the generation of the output pulse from AND gate 150.

The output signal from AND gate 150, which represents a composite of the horizontal sync and burst timing of the incoming color video information, is coupled to terminal 16 of write address generator 22 of FIG. 1 and in turn to switch S₁, shown diagrammatically, which couples in a first position the composite horizontal sync and burst timing signal directly to the ready-to-write pulse generator in write address generator 22 in which the ready-to-write-into memory signal appearing at terminal 17 of FIG. 1 is developed. In the other position of switch S₁, the output signal of AND gate 150 is delayed in delay circuit 170 a fixed amount, 140 nanoseconds in the NTSC system, so as to delay the development of the ready-to-write-into memory signal, which effectively shifts the color image information by 180° to coincide with the preassigned burst phasing of coherent memory 20. A field identification switch 190 enabled by the field identification signal of the incoming video signal is utilized to determine if the writing-into-memory is to be delayed in the following manner. Field 1 - no delay, field 3 - delay, field 2 - delay, and field 4 - no delay. Thus, the color video information is stored coherently in accordance with the preassigned burst phasing without loss of color coherency on read-out in a memory of significantly reduced capacity as compared to a memory constructed in accordance with the prior art practice of storing the entire horizontal line interval including the horizontal blanking interval in the memory.

Although the present invention has been described in terms of a composite video signal according to the NTSC television standards, the principles of the invention are equally applicable to other television standards such as PAL, PAL-M, and SECAM. These other standards do contain differences from the NTSC system which require modification to the portions of the synchronizer, among these are: the clock frequencies must be adjusted for differences in subcarrier frequency which determines the number of samples per line, i.e., 4.33 Megahertz in PAL versus 3.58 Megahertz in NTSC. Similarly, the capacity of the memory in terms of lines stored must be adjusted to accommodate the number of vertical lines in each system, typically 625 in PAL, 525 in PAL-M, and 625 in SECAM. In addition, the memory organization and controlling logic must be adjusted to the individual color signal differences in each system such as the eight unique fields in PAL in terms of burst phase sequence as against only four unique fields in terms of the NTSC burst phase sequence, while in SECAM the burst frequency in the form of an undeviated subcarrier alternates on each line but is of a different frequency on each line. The horizontal and vertical synchronizing signals of each television system must also be accommodated in generating the write addresses for writing-into-memory and generating the read addresses for reading-out of memory.

What is claimed is:

1. A television signal synchronizer in which incoming video signals are written into memory storage means, said incoming video signals comprising one or more television fields, each of said television fields comprising horizontal line signals having a horizontal blanking interval containing horizontal and burst synchronizing signal components and an active image information portion, said burst signal component being opposite in phase from one of said television fields to another, comprising:

coherent memory storage means having preassigned fixed burst phasing for each line store of said memory storage means;

signal processing means for developing a composite horizontal sync and burst timing control signal indicative of the timing of said incoming video signal; and delay means responsive to said control signal for delaying the writing into memory of only said active video image information portion(s) so as to write said video image information portion into said memory storage means consistent with said preassigned fixed burst phasing.

2. A system for processing video information signals in which incoming video signals are written into memory storage means, said incoming video signals including horizontal line signals having a horizontal blanking interval containing horizontal and burst signals synchronizing components and an active image portion, said burst signal components being opposite in phase from one of said television lines to another, comprising:

input means coupled to a source of incoming video information signals;

reference means coupled to said input means for generating a reference signal synchronized with said incoming video information;

signal processing means coupled to said input means and to said reference means for processing said video information signals in synchronism with said reference signal prior to writing into said memory storage means;

said memory storage means having preassigned fixed burst phasing for each line store of said memory storage means;

said signal processing means including means for developing a composite horizontal sync and burst timing control signal indicative of the timing of said incoming video signal and delay means responsive to said control signal for delaying said reference signal; and memory control means coupled to said memory storage means and responsive to said reference signal for generating a write memory storage control signal whereby only said active video image information portion is read into said memory storage means consistent with said preassigned fixed burst phasing.

3. A television signal synchronizer in which incoming video signals are written into memory storage means while previously stored video signals are read out of said memory storage means, said incoming video signals comprising one or more television fields, each of said television fields comprising horizontal line signals having a horizontal blanking interval containing horizontal and burst signal synchronizing components and an active image portion, said burst signal components being opposite in phase from one of said television fields to another, comprising:

input means coupled to a source of incoming video information signals;

input write clock means coupled to said input means for generating a write clock signal synchronized with said incoming video information;

first sampling means coupled to said write clock for sampling said video information signal at a rate determined by said write clock signal prior to writing into said memory storage means, said input write clock means developing a ready-to-write signal at the completion of said sampling;

said memory storage means having preassigned fixed burst phasing for each line store of said memory storage means;

said signal processing means including means for developing a composite horizontal sync and burst timing control signal indicative of the timing of said incoming video signal and delay means responsive to said control signal for delaying said ready-to-write signal;

output read clock means for generating a read clock signal;

second sampling means coupled to output means and to said read clock for sampling said stored video information signals read out of said storage means, said output clock means developing a ready-to-read signal prior to said sampling; and memory control means coupled to said memory storage means and responsive to said ready-to-write and said ready-to-read signals for developing write and read memory storage control signals whereby only said active video image information portion is read into said memory storage means consistent with said preassigned fixed burst phasing.

* * * * *

UNITED STATES PATENT OFFICE
CERTIFICATE OF CORRECTION

PATENT NO. : 4,101,926

DATED : July 18, 1978

INVENTOR(S) : Robert Adams Dischert et al

It is certified that error appears in the above-identified patent and that said Letters Patent are hereby corrected as shown below:

Column 3, line 62, that portion reading "read-to-write" should read -- ready-to-write --.

Signed and Sealed this

Nineteenth Day of December 1978

[SEAL]

Attest:

RUTH C. MASON
Attesting Officer

DONALD W. BANNER
Commissioner of Patents and Trademarks